United States Patent [19]

Harris et al.

[11] Patent Number: 5,115,228
[45] Date of Patent: May 19, 1992

[54] SHUTTERED DISPLAY PANEL

[75] Inventors: Richard H. Harris, Raleigh; Richard G. Minor, Wake Forest; Robert W. Price, Cary, all of N.C.

[73] Assignee: International Business Machines Corporation, Armonk, N.Y.

[21] Appl. No.: 561,758

[22] Filed: Aug. 2, 1990

[51] Int. Cl.$^5$ ............................................. G09G 3/02
[52] U.S. Cl. ................................... 340/716; 340/717; 340/763; 359/36; 359/277
[58] Field of Search ............... 340/716, 717, 718, 763, 340/781, 783, 785, 786, 766, 771; 358/242, 236, 254; 350/356

[56] References Cited

U.S. PATENT DOCUMENTS

| | | | |
|---|---|---|---|
| 3,775,881 | 12/1973 | Salam | 40/2 C |
| 4,173,757 | 11/1979 | Hareng et al. | 350/331 |
| 4,234,245 | 11/1980 | Toda et al. | 350/269 |
| 4,243,986 | 1/1981 | Nixon | 340/756 |
| 4,264,906 | 4/1981 | Wakatake | 340/764 |
| 4,373,157 | 2/1983 | Holz et al. | 340/805 |
| 4,490,739 | 12/1984 | Himuro et al. | 358/66 |
| 4,562,433 | 12/1985 | Biferno | 340/784 |
| 4,688,033 | 8/1987 | Carini et al. | 340/781 |
| 4,856,877 | 8/1989 | Nishimori et al. | 350/356 |
| 4,973,951 | 11/1990 | Shigeta et al. | 340/717 |

Primary Examiner—Alvin E. Oberley
Assistant Examiner—Chanh Nguyen
Attorney, Agent, or Firm—Lauren Bruzzone; Joscelyn Cockburn; Blaney Harper

[57] ABSTRACT

The present invention accomplishes the above objects by employing a display having the capability to emit light and form images viewable from both the front and back of the display. The invention also shutters the images displayed on the front and back of the display so that the images can be correctly displayed depending on the viewpoint of the viewer. Text and images displayed such that they are seen from both the front and back of the display appear differently to the front and rear viewer. Electronic shutters are placed between the display and both the front and rear viewers so that they can be flashed on and off fast enough to provide a stable image appearing to each viewer. The shutters also flash slow enough so that display data can be rewritten to provide each viewer with a correct image. The correct image can be either the corrected image of that image seen by the opposing viewer, or a completely separate image. In this way, simultaneous images appear to both the front and rear viewer. These images can be the same or different even though they appear from the same display. The use of electronic shutters on displays emitting light from both the front and rear of the display, provide the display with multiple functions not possible on conventional displays.

10 Claims, 3 Drawing Sheets

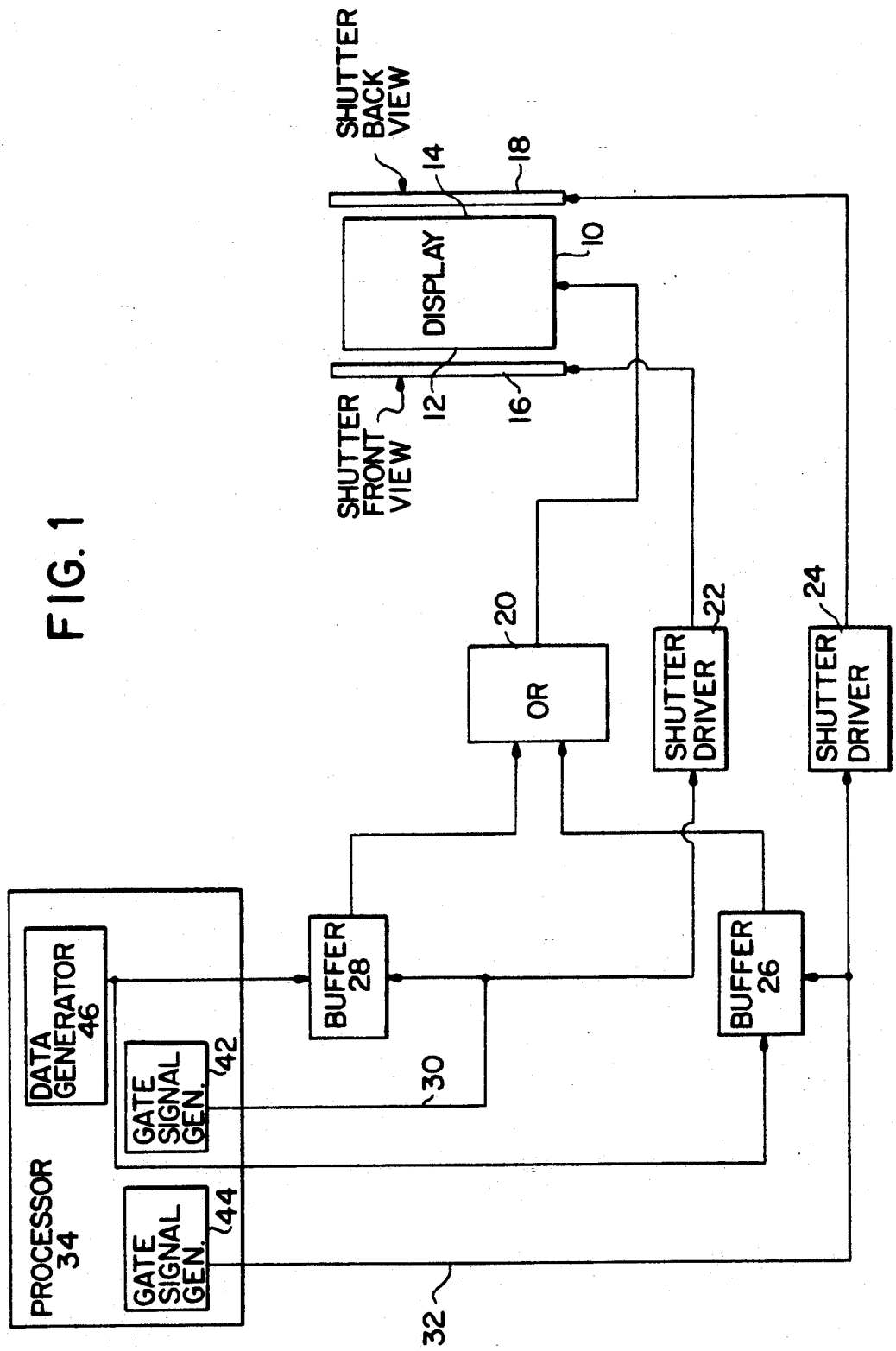

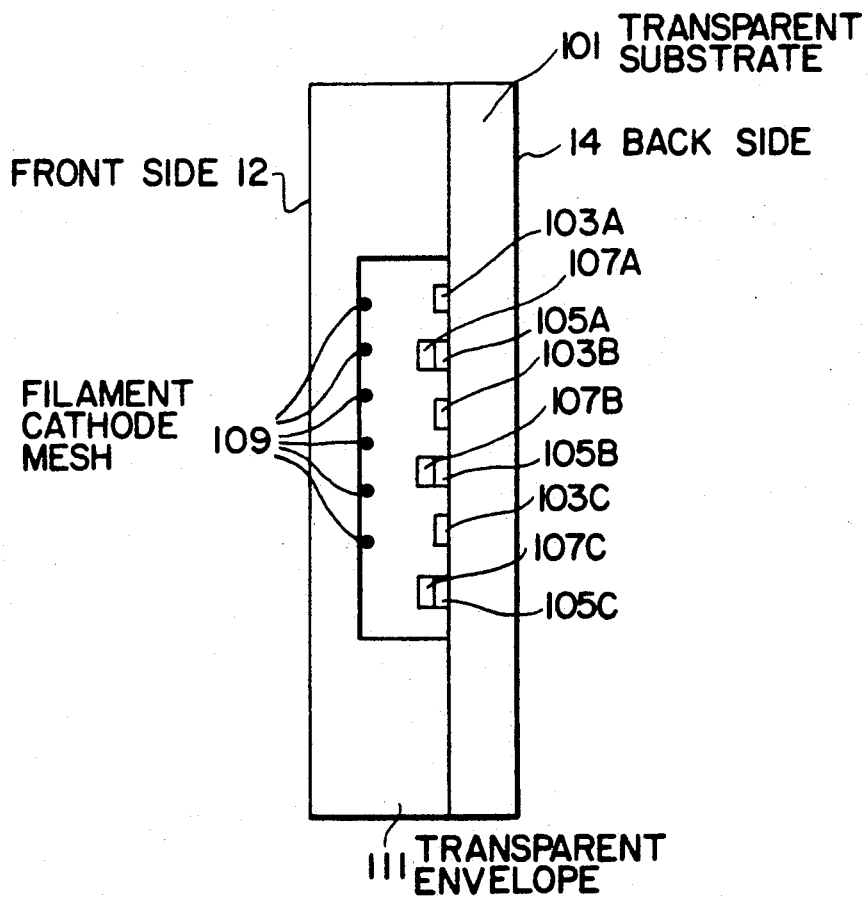

SHUTTERED DISPLAY PANEL

FIELD OF THE INVENTION

This invention relates generally to the field of electrical communication. More specifically, the invention relates to selective visual display communication systems and the use of shuttered displays to produce multiple function displays.

BACKGROUND OF THE INVENTION

Display technology is an integral part of the productivity of information processing equipment. The use of displays to effectively communicate to the operators of the equipment and others affected by the information being processed has been of fundamental concern to users of the information processing equipment for many years. A particular concern is the difficulty of displaying two sets of information to two different users of the equipment at the same time. This concern arises out of relationships similar to that of a customer and salesperson or a teacher and student. The information processing equipment contains data of interest to both parties, but can only display the data in a single format because of the physical limitations of the display. The data would be more useful to both parties if it was displayed with a different form or emphasis to each party.

The prior art has responded to this problem by developing systems having two different displays, one for each party. In such a system, each display provides the information required by a single party. Providing two displays is an expensive solution and one that few users find acceptable. Another prior art solution to the problem has been to provide windows on a single display. This display reserves different parts of a single screen for different information. This is an improvement, however it still requires both parties to view the same screen, and therefore, it is still inadequate for many purposes. The single screen display limitation is primarily a result of the display having an excitation source which has not been adapted to multiple screen applications. For example, CRTs have electron beams as the excitation source to a phosphoring screen. However, typical generation of the electron beam requires that the phosphoring screen only be viewed from the front of the screen. Similarly, liquid crystal displays (LCDs) depend on light passing through the back of the screen, through the transparent electrodes, and finally through the front of the screen. Viewing the screen from both sides is impossible because either a reflective backing or a light source is on the rear of the screen. In both cases, the excitation source itself inhibits utilizing both sides of the display screen for multiple function purposes.

OBJECTS

It is an object of the present invention to improve the functionality of electronic displays.

It is another object of the present invention to inexpensively improve the functionality of electronic displays.

It is a further object of the present invention to inexpensively present different images to different users through an improved electronic display.

It is still a further object of the present invention to inexpensively present different graphical and textual information to different users through an improved electronic display.

SUMMARY OF THE INVENTION

The present invention accomplishes the above objects by employing a display having the capability to emit light and form images viewable from both the front and back of the display. The invention also shutters the images displayed on the front and back of the display so that the images can be correctly displayed depending on the viewpoint of the viewer. Text and images displayed such that they are seen from both the front and back of the display appear differently to the front and rear viewer. Electronic shutters are placed between the display and both the front and rear viewers so that they can be flashed on and off fast enough to provide a stable image appearing to each viewer. The shutters also flash slow enough so that display data can be rewritten to provide each viewer with a correct image. The correct image can be either the corrected image of that image seen by the opposing viewer, or a completely separate image. In this way, simultaneous images appear to both the front and rear viewer. These images can be the same or different even though they appear from the same display. The use of electronic shutters on displays emitting light from both the front and rear of the display, provide the display with multiple functions not possible on conventional displays.

DESCRIPTION OF THE FIGURES

FIG. 1 illustrates a preferred embodiment of the present invention.

FIG. 2 illustrates a type of display useful for the preferred embodiment of the present invention.

PREFERRED EMBODIMENT

Figure 3A:
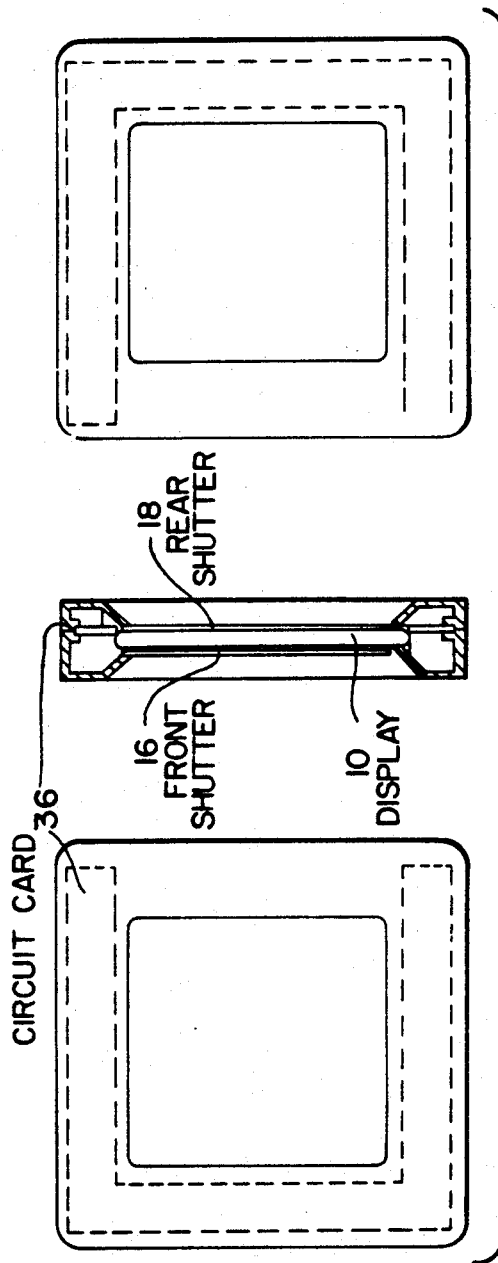
FIG. 3A and B illustrates an alternate embodiment of the present invention employing partial shutters.

FIG. 1 illustrates the preferred embodiment of the present invention. A display 10 having front side 12 and back side 14 is interposed between front shutter 16 and rear shutter 18. The display is driven through OR gate 20 by either buffer 26 or buffer 28. Front shutter 16 is driven by shutter driver 22 in sequence with buffer 28. Rear shutter 18 is driven by shutter driver 24 in sequence with buffer 26. Gate signal 30 drives both buffer 28 and shutter driver 22. Gate signal 32 drives both buffer 26 and shutter driver 24. Gate signals 30 and 32 are generated by gate signal generators 42 and 44 respectively. The data contained in buffers 26 and 28 is generated by data generator 46. Gate signal generators 42 and 44 and data generator 46 are part of processor 34.

Display 10 is a display which emits light from a source between the front side 12 and the back side 14 through both the front side 12 and the back side 14. In the preferred embodiment the display is a vacuum fluorescent type display. FIG. 2 illustrates a vacuum fluorescent type of display. The transparent substrate 101 has transparent integrated circuit patterns 103 A, B, and C. The transparent integrated circuit patterns connect to transparent anodes 105 A, B, and C which are covered by a pattern of fluorescent material 107 A, B, and C. The electrode 105 and fluorescent material 107 form a pattern of phosphor pixels, typically 35 to 60 pixels per character on the display. The pixels are spaced apart from a filament cathode mesh 109. The mesh 109 rests in a cavity of a transparent envelope 111 which seals a vaccum. Voltage is applied between the filament mesh 109 and the transparent anodes 105 and this causes the fluorescent material to glow or emit light. Both the substrate 101 and the envelop 111 are transparent. This allows the image from the phosphor pixels to be visible from both sides of the display. Another type of display which would be appropriate for the present invention is a plasma display in which a transparent envelope encloses a grid of electrodes. A plasma is generated, providing a light source through both sides of the envelope, when the electrodes forming an intersection in the grid are energized. Both types of displays are well known in the display art and, in general, any type of display which emits light through opposing sides of the display is appropriate for the present invention.

Shutters 16 and 18 are electronic shutters which pass light when voltage is applied and block light when voltage is not applied. The type of shutter used in the preferred embodiment is a liquid crystal emulsion spread between transparent electrodes. The transparent electrodes are connected to a shutter driver for applying voltage between the transparent electrodes. The transparent electrodes are also laminated to a plastic backing film which provides structural support for both the liquid crystal material and the transparent electrodes. When the voltage is not applied to the electrodes, the liquid crystals diffract or scatter light attempting to pass through the shutter. When the voltage is applied to the electrodes, the crystals align to typically pass greater than 70% of incident light. The shutter must be able to turn on and off frequently enough so that the image shown by the display 10 is flicker free. The present shutter meets this basic requirement because it typically has an on/off cycle of greater than 60 times per second. The two requirements of clarity and shutter speed are met by several types of electronic shutters commonly available in the prior art used in such applications as glare control or vision testing. One such type of shutter comprises a nematic curvilinear aligned phase (NCAP) liquid crystal material sandwiched between indium tin oxide (ITO) transparent electrodes, which are in turn, laminated to a Mylar(R) backing material. Such a structure is described in U.S. Pat. No. 4,669,828, filed Apr. 16, 1984, and assigned to Taliq Corporation of Mountainview California, which is hereby incorporated by reference into this application. These types of shutters are suitable for application in the present invention as shown in FIG. 1.

Shutters 16 and 18 are driven by shutter drivers 22 and 24 respectively. Gate signal 30, in turn, drives shutter driver 22 and simultaneously drives buffer 28. Similarly, gate signal 32 drives shutter driver 24 and simultaneously buffer 26. Display 10 displays the data from either buffer 26 or 28 through OR gate 20. Data generator 46 provides data for both buffers 26 and 28. The data provided for buffer 26 need not, and normally is not, the same data provided for buffer 28. Data generator 46 coordinates sending data to buffers 26 or 28 with the generation of gate signals 30 and 32. Display 10 only shows the data from one buffer because the gate signal 30 and gate signal 32 are completely out of phase with respect to each other. That is, when gate signal 30 is on, gate signal 32 is off, and when gate signal 32 is on, gate signal 30 is off. This timing relationship between the shutters 16 and 18 and the buffers 26 and 28 is necessary because character images seen from the display back side 14 are the reverse of the images seen from the display front side 12. Therefore, in order to show the same image to both front and rear viewers, the images have to be re-written. Showing a front image at approximately 60 times per second, and showing a rewritten rear image at approximately 60 times per second, provides both the front and rear viewers the desired images simultaneously (even though the front and rear images may be different) on a single display.

Figure 3B:
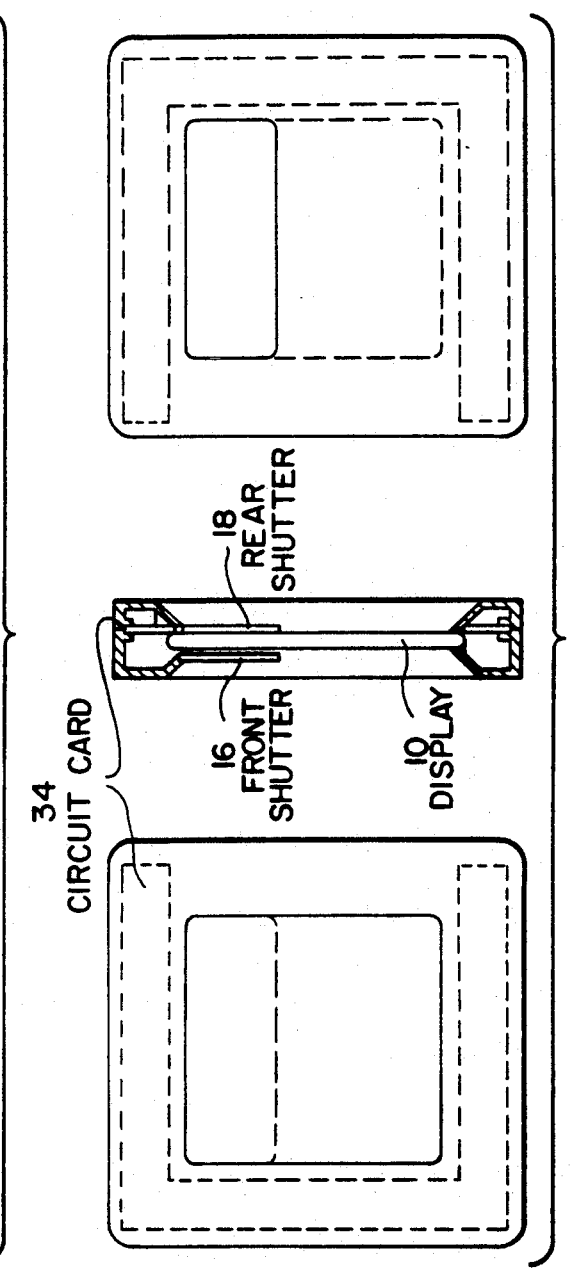

Some images displayed on the front side of the display appear identical to the image on the rear side of the display without any shutter/buffer timing. In those cases, the shutters and buffers are redundant. Alternate embodiments of the present invention account for this by shuttering only part of the display. FIG. 3a illustrates the preferred embodiment of the display. There is a front and rear side to the display surrounded on three sides by a circuit card 36 for holding the connections to the shutter and display electrodes. FIG. 3b illustrates an alternate embodiment of the display. The front and rear shutters of this display cover only part of the display compared to the shutters in FIG. 3a. The information seen on the display below the shutter in 3b is intended to be such that it appears the same to both sides of the screen. The information appearing in the shuttered area is switched between the correct front view and the correct rear view using shutters 16 and 18 as illustrated in the preferred embodiment.

The buffer arrangement for a partially shuttered display system can be the same as for the fully shuttered display system or a separate buffer can be used to address the non-shuttered part of the display while timed buffers and shutters are again employed for the shuttered part of the display. Additionally, the timing relationship between the front and rear shutters does not need to be completely out of phase if the buffered data is multiplexed through a different system than an OR gate. For example, shutters 16 and 18 could be made into two shutters for a total of four shutters on the display. A front and a rear shutter could be in phase depending on the data to be shown while the remaining shutters are out of phase. As long as the images shuttered to the front and rear viewer are at a fast enough rate (for example, 60 cycles/second) and the data to be displayed corresponds to the correct part of the display for the shutter and the side to be viewed, then the timing relationship between the different buffers and different shutter drivers is satisfied.

Processor 34 comprises gate signal generators 42 and 44 as well as the data generator 46. Therefore, processor 34 determines what data corresponds to which part of the display screen and which shutters (this is similar to the processor 34, through data generator 46, determining which data is to go into which buffer, either 26 or 28, in the preferred embodiment). The process of this determination is well known to those skilled in the art as is utilizing multiple processing units to form processor 34 for the generation of gate signals and display data. The present invention incorporates the flexibility of this art to form several embodiments of a multiple function display using electronic shutters. One example is the use of multiple processors in a display system in which one processor generates gate signals and one processor generates display data. The coordination between the multiple processors performs the function illustrated by the single processor 34 in the preferred embodiment. A further example is the use of display areas which are shuttered by one or more shutters. The processor 34 determines the coordination between the area displayed and which shutter the screen area corresponds to, as well as the timing of when particular shutters turn off or on.

While this invention has been particularly described and illustrated with references to plural embodiments thereof, it will be understood by those skilled in the art that changes in the above description or illustrations may be made with respect to form or detail without departing from the spirit or scope of the invention.

We claim:

1. An electronic display system comprising:
   a display for displaying an image through a front and rear side of said display;
   a front shutter coupled to said display front side;
   a rear shutter coupled to said display rear side;
   a shutter control means coupled to said display for controlling said front shutter and said rear shutter;
   said shutter control means opening said front shutter when said image is to be seen through said display front side and closing said front shutter when said image is not to be seen through said front side;
   said shutter control means opening said rear shutter when said image is to be seen through said display rear side and closing said rear shutter when said image is not to be seen through said rear side; and
   said shutter control means coordinates opening said front shutter with opening said rear shutter to display said image on said front side during a first time interval and to display said image on said rear side during a second time interval wherein said first time interval is out of phase with respect to said second time interval.

2. An electronic display system as in claim 1, further comprising:
   an image source for transmitting at least two images to said display;
   said display displaying a first image through said front and rear sides of said display;
   said shutter control means controlling said front and rear shutters, in response to said first image being transmitted, to display said first image through said front shutter and to prevent display of said first image through said rear shutter;
   said display displaying a second image through said front and rear sides of said display after displaying said first image; and said shutter control means controlling said front and rear shutters, in response to said second image being transmitted, to display said second image through said rear shutter and to prevent display of said second image through said front shutter.

3. An electronic display system comprising:
   a display for displaying an image through a front and rear side of said display;
   a front shutter coupled to said display front side;
   a rear shutter coupled to said display rear side;
   a shutter control means coupled to said display for controlling said front shutter and said rear shutter;
   said shutter control means opening said front shutter when said image is to be seen through said display front side and closing said front shutter when said image is not to be seen through said front side;
   said shutter control means opening said rear shutter when said image is to be seen through said display rear side and closing said rear shutter when said image is not to be sen through said rear side; and
   said shutter control means coordinates opening said front shutter with opening said rear shutter to display said image on said front side during a first time interval and to display said image on said rear side during a second time interval wherein said first time interval is out of phase with respect to said second time interval,
   said shutter control means comprising a front shutter driver, a rear shutter driver, a first gate signal generator, and a second gate signal generator;
   said front shutter transmitting light in response to said front shutter driver, said front shutter driver responsive to a first phase of a gate signal from said first gate signal generator, said first gate signal having two phases;
   said rear shutter transmitting light in response to said rear shutter driver, said rear shutter drive responsive to a first phase of a gate signal from said second gate signal generator, said second gate signal having two phases;
   said first gate signal being out of phase with said second gate signal; and
   said front and rear shutters preventing transmissions of light when said first and second gate signals are in a second phase.

4. An electronic display system as in claim 3, further comprising:
   an image source for transmitting at least two images to said display;
   said display displaying a first image through said front and rear sides of said display;
   said shutter control means controlling said front and rear shutters, in response to said first image being transmitted, to display said first image through said front shutter and to prevent display of said first image through said rear shutter;
   said display displaying a second image through said front and rear sides of said display after displaying said first image; and said shutter control means controlling said front and rear shutters, in response to said second image being transmitted, to display said second image through said rear shutter and to prevent display of said second image through said front shutter.

5. An electronic display system comprising:
   a display for displaying a plurality of images through a front and rear side of said display;
   a plurality of front shutters coupled to said display front side;
   a plurality of rear shutters coupled to said display rear side;
   a shutter control means coupled to said display for controlling said plurality of front shutters and rear shutters;
   said shutter control means opening at least one of said front shutters when at least one of said images is to be seen through said display front side and closing at least one of said front shutters when at least one of said images is not to be seen through said front side;
   said shutter control means opening at least one of said rear shutters when at least one of said images is to be seen through said display rear side and closing at least one of said rear shutters when at least one of said images is not to be seen through said rear side; and
   said shutter control means coordinates opening said plurality of front shutters with opening said plurality of rear shutters to display at least one image on said front side during a first time interval and to display at least one image on said rear side during a second time interval wherein said first time interval is out of phase with respect to said second time interval.

6. An electronic display system as in claim 5, further comprising:
an image source for transmitting said plurality of images to said display;
said display displaying a first plurality of images through said front and rear sides of said display;
said shutter control means controlling said front and rear shutters, in response to said first plurality of images being transmitted, to display at lest one of said first plurality of images through at least one of said front shutters and to prevent display of at least one of said first plurality of images through at least one of said rear shutters;
said display displaying a second plurality of images through said front and rear sides of said display after displaying said first plurality of images; and
said shutter control means controlling said front and rear shutters, in response to said second plurality of images being transmitted, to display at least one of said second plurality of images through at least one of said rear shutters and to prevent display of at least one of said second plurality of images through at least one of said front shutters.

7. A method of displaying data comprising:
displaying an image through a front and rear side of a display;
controlling a front shutter and a rear shutter through a shutter control means to display said image from said front and rear sides of said display through said front and rear shutters, said front and rear shutters being coupled to said front and rear sides respectively of said display;
opening said front shutter when said image is to be seen through said display front side and closing said front shutter when said image is not to be seen through said front side; and
opening said rear shutter when said image is to be seen through said display rear side and closing said rear shutter when said image is not to be seen through said rear side; and
coordinating said shutter control means to display said image on said front side during a first time interval and to display said image on said rear side during a second time interval wherein said first time interval is out of phase with respect to said second time interval.

8. A method of displaying data, as in claim 7, further comprising:
transmitting at least tow images to said display;
displaying a first image through said front and rear sides of said display;
controlling said front and rear shutters, in response to said first image being transmitted, to display said first image through said front shutter and to prevent display of said first image through said rear shutter;
displaying a second image through said front and rear sides of said display after displaying said first image; and controlling said front and rear shutters, in response to said second image being transmitted, to display said second image through said rear shutter and to prevent display of said second image through said front shutter.

9. A method of displaying data comprising:
displaying an image through a front and rear side of a display;
controlling a plurality of front shutters and a plurality of rear shutter through a shutter control means to display said image from said front and rear sides of said display through said plurality of front and rear shutters, said plurality of front and rear shutters being coupled to said front and rear sides respectively of said display;
opening at least one of said plurality of front shutters when said image is to be seen through said display front side and closing at least one of said plurality of front shutters when said image is not to be seen through said front side; and
opening at least one of said plurality of rear shutters when said image is to be seen through said display rear side and closing at least one of said plurality of rear shutters when said image is not to be seen through said rear side; and
coordinating said shutter control means to display said image on said front side during a first time interval and to display said image on said rear side during a second time interval wherein said first time interval is out of phase with respect to said second time interval.

10. A method of displaying data, as in claim 9, further comprising:
transmitting at least two images to said display;
displaying a first image through said front and rear sides of said display;
controlling said plurality of front and rear shutters, in response to said first image being transmitted, to display said first image through said at least one of said plurality of front shutters and to prevent display of said first image through at least one of said plurality of rear shutters;
displaying a second image through said front and rear sides of said display after displaying said first image; and
controlling said plurality of front and rear shutters, in response to said second image being transmitted, to display said second image through at least one of said plurality of rear shutters and to prevent display of said second image through at least one of said plurality of front shutter.

* * * * *

UNITED STATES PATENT AND TRADEMARK OFFICE
CERTIFICATE OF CORRECTION

PATENT NO. : 5,115,228
DATED : May 19, 1992
INVENTOR(S) : Harris, et al.

It is certified that error appears in the above-identified patent and that said Letters Patent is hereby corrected as shown below:

Col. 7, claim 6, line 11,
    delete "lest" and insert --least--.

Col. 7,
Claim 8, line 51, delete "tow" and insert --two--.

Signed and Sealed this

Fourteenth Day of June, 1994

Attest:

BRUCE LEHMAN

*Attesting Officer*     *Commissioner of Patents and Trademarks*